United States Patent [19]

Ryu et al.

[11] Patent Number: 5,519,861
[45] Date of Patent: May 21, 1996

[54] SAMPLED DATA STORAGE AND EDITING SYSTEM FOR THE TIME SERIES DATA BEING DISPLAYED ACCORDING TO COLLECTION LOCATION

[75] Inventors: Tadamitsu Ryu, Yokohama; Yoshio Mogi, Tochigi; Takanori Fukatsu, Kawasaki; Masahiko Murakawa, Kawasaki; Toshio Takahara, Kawasaki; Shingo Hirono, Tokyo; Takashi Ohshiro, Kawasaki; Tohru Matsumoto, Yokohama, all of Japan

[73] Assignee: Fujitsu Limited, Kawasaki, Japan

[21] Appl. No.: 365,186

[22] Filed: Dec. 28, 1994

Related U.S. Application Data

[63] Continuation of Ser. No. 768,607, filed as PCT/JP91/00302, Mar. 6, 1991, abandoned.

[30] Foreign Application Priority Data

Mar. 9, 1990 [JP] Japan ..................................... 2-59067
Mar. 20, 1990 [JP] Japan ..................................... 2-71607
Mar. 20, 1990 [JP] Japan ..................................... 2-71608

[51] Int. Cl.$^6$ .............................. G06F 13/00; G06F 15/00
[52] U.S. Cl. .................... 395/600; 395/200.02; 395/164; 395/845; 364/DIG. 2; 364/920; 364/927.2; 364/934
[58] Field of Search ............................. 395/600, 200.02, 395/845, 164; 364/DIG. 1, DIG. 2

[56] References Cited

U.S. PATENT DOCUMENTS 4,604,736 8/1986 Demeure ................................. 367/123
4,954,981 9/1990 Dehner .................................... 395/140
5,116,116 5/1992 Aizu ........................................ 351/221
5,243,511 9/1993 Zifferer ................................... 364/147

FOREIGN PATENT DOCUMENTS 2516328 5/1983 France .
3505314 8/1985 Germany .

OTHER PUBLICATIONS

Paradox User Guide, (1985, 1990) pp. 36, 126–135.

Primary Examiner—Thomas G. Black
Assistant Examiner—Jean R. Homere

[57] ABSTRACT

The present invention is a system that converts a vertical file (28) of time series data records from multiple terminals (10–14) and stored by time into a horizontal file (52) where records are organized by terminal (10–14). The user can then access the desired terminal information rapidly in the horizontal file (52) rather than having to perform an inefficient sequential search of the vertical file (28). After the terminal data is horizontally stored, the data is used to create display or print-out windows of the terminal data for many locations. Each window includes the data from a single terminal (10–14). For example, each window could include a graph of rain data for a location. The system also creates a cross reference table (76) of the addresses of the data used to create each window. When the display arrangement is altered, the data in the horizontal file (52/74) is reorganized to match the display order while only the physical addresses of the data for each terminal are changed in a new cross reference table (80).

4 Claims, 7 Drawing Sheets

FIG. 3a

| | A | B | C | D |
|---|---|---|---|---|
| P | a1d1 | a2d1 | | a4d1 |
| Q | a1d2 | | | |
| R | a1d3 | | | a4d3 |

70

DISPLAY SEGMENT

| | D | B | A | C |
|---|---|---|---|---|
| Q | a4d2 | a2d2 | | a3d2 |
| P | a4d1 | | a1d1 | |
| R | a4d3 | | | a3d3 |

1AAA P-A
2AAA P-B
3AAA P-C
      P-D
       ⋮
3FFF R-C
4FFF R-D

| | A | B | C | D |
|---|---|---|---|---|
| P | 1AAA | 2AAA | 3AAA | 4AAA |
| Q | 1CCC | 2CCC | 3CCC | 4CCC |
| R | 1FFF | 2FFF | 3FFF | 4FFF |

76

78

5AAA Q-D
6AAA Q-B
7AAA Q-A
      Q-C
      P-D
       ⋮
7FFF R-A
8FFF R-C

| | A | B | C | D |
|---|---|---|---|---|
| P | 7CCC | 6CCC | 8CCC | 5CCC |
| Q | 7AAA | 6AAA | 8AAA | 5AAA |
| R | 7FFF | 6FFF | 8FFF | 5FFF |

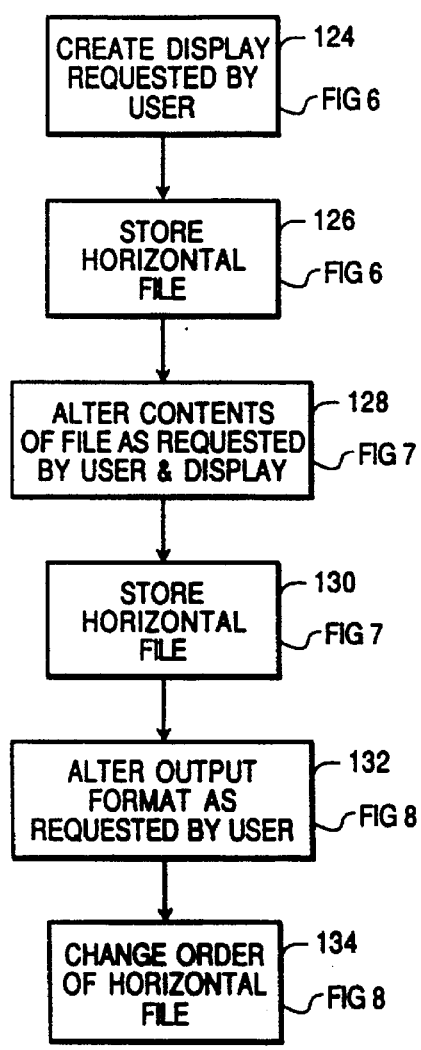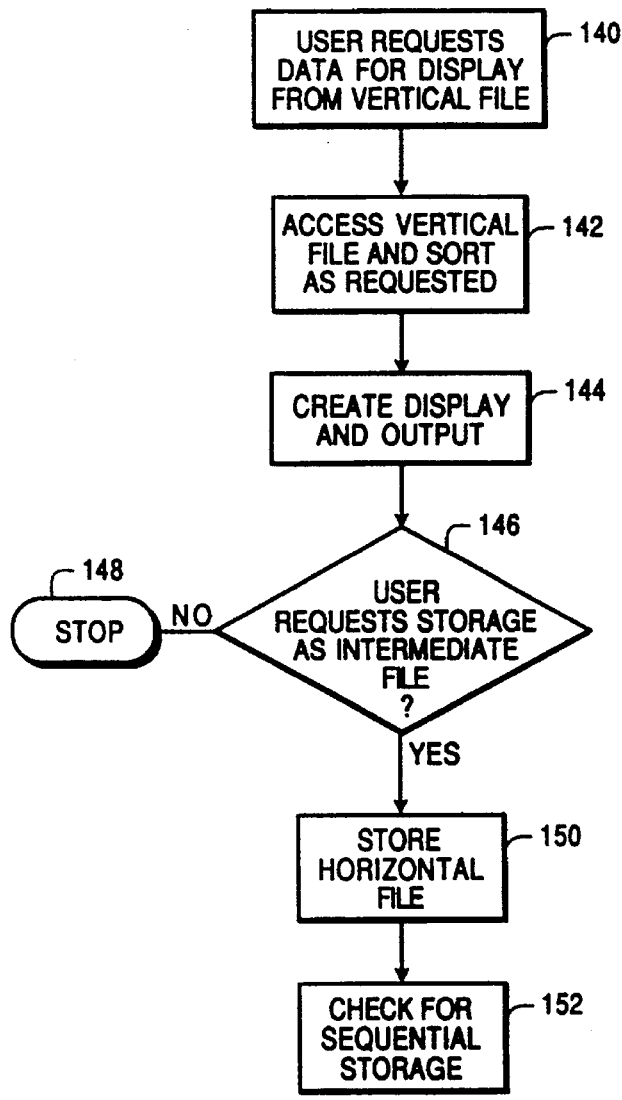

SAMPLED DATA STORAGE AND EDITING SYSTEM FOR THE TIME SERIES DATA BEING DISPLAYED ACCORDING TO COLLECTION LOCATION

This application is a continuation of application No. 07/768,607, filed Sep. 30, 1991, now abandoned.

TECHNICAL FIELD

The present invention is directed to a system that collects data and organizes that data for display and, more particularly, to a system that collects time series data from remote terminals, stores the time series data in a vertical file, converts the vertical file into a horizontal file or horizontal intermediate files suitable for searching or display and allows the horizontal file or files to be rearranged to match a display organization desired by a user.

BACKGROUND ART

Conventional time series data collection systems, such as illustrated in FIG. 1, include remotely located data collection terminals 10–14, which could be microcomputers or simple digital sampling systems. Such systems in response to a request from a computer 16, obtain data from sensors 18–22 and serially transmit that data to the computer 16 over a communication network 24 which could be a private dedicated network or a network which uses the public telephone system. A typical response from a terminal will include a terminal number, a date and time of the data sample, the data, a time interval over which the data was collected and a data type. The typical response will have a length of approximately fourteen bytes. As the data, which could amount to thousands of samples per second, is collected from the terminals 10–14, it is stored by the computer 16 in a storage unit 26, such as a hard magnetic disk, and organized as a vertical file where each fixed length record 28 corresponds to a sampling time "T" each terminal "a" corresponds to an entry 30 in that record and the data "d" collected from each terminal corresponds to fields 32 within that entry. Of course, it is possible for the data collected during any one time period to be stored in a separate time file and, if so, the terminal responses would be records and the data collected from each terminal would be the entries within the record. The data collected and stored by this type of conventional system is typically data, such as weather data, which is collected from many remote locations and analyzed at a central location, such as the National Weather Service. Once this data is collected, it is common practice for a user to display the data graphically on a display 34 or print the data using a printer. However, the user sometimes prefers to view the data organized by terminal or location rather than by time as the data is originally stored. The user also sometimes prefers to display the data from plural locations at the same time to allow visual comparison of various locations. Such a display 36, produced by conventional software, is illustrated in FIG. 1 where rain, temperature and pollution data graphs for 4 locations are displayed at the same time. The generation of this display 36 requires a considerable amount of time because the data as displayed is organized very differently from the data as it is stored. For example, to collate the data for the rain "d1" at the Osaka data collection terminal "a1" over a period of time and display that data as a graph requires that the computer 16 access and store, in a file, the entry 30 and data field 32 in each record 28 corresponding to the Osaka terminal within the time window desired and provide that data or file to a conventional graphics package. Searching for and locating the desired data can be very time consuming since the search is typically sequential. This operation must be repeated for each one of the data types and locations to be displayed as requested by the user. The individual graphic displays are then passed to a conventional window display package which produces the contents of each of the windows in the display 36. If the user then decides that the arrangement of graphs on the display 34 should be different, as illustrated by the display 38 in FIG. 1 where the display locations and data types have been rearranged, the computer 16 must start over by reading the vertical file 28.

The problem with the slow access time and the inefficient use of the computer resources, as discussed above, becomes even worse when the system allows the user to select different portions of the display 38 for output to either a printer or to be sent to a remote location display over the network 24. For example, the user may want to display the Kawasaki rain data with the Tokyo rain data and send that information to a Tokyo office and then display the Osaka and Nagoya rain data and send that to a different office. This situation involves a still further reorganization of the data and thus starting the process over again with the access to the vertical file 28.

It is therefore an object of the present invention to provide a system which does not require sequential search of time records in a vertical file to collate terminal data. It is also an object of the present invention to provide a system that includes an intermediate horizontal file of data sorted by terminal. It is another object of the present invention to store time series data in a database having multiple dimensions allowing efficient multidimensional searches. It is an object of the present invention to provide increased data security by storing both vertical and horizontal files which duplicate the stored data. It is a further object of the present invention to provide a system that allows related data on a display to be freely rearranged without requiring substantial computer search time.

DISCLOSURE OF THE INVENTION

The above objects can be accomplished by a system that converts a vertical file of terminal records ordered by time into a horizontal or lateral file or files where records are stored and organized or ordered, in a storage unit, by terminal. The user can then access the desired terminal information rapidly. After the terminal data is stored, the data is used to create a display of the terminal data for many locations along with a cross reference table of the terminal data addresses for each segment. When the display arrangement is altered, the data in the file is reorganized to match the display, thereby reducing future search time, while only the addresses of the data are changed in the cross reference table.

More particularly the above objects may be accomplished by a method and system. The system is a data collection, storage and display system, comprising: remote terminals producing time series data; a communication network connected to said remote terminals; data storage means for storing data; display means for displaying data in windows; data collection means for collecting the time series data over said communication network from said remote terminals and storing the time series data in a vertical file ordered by time; display creation means for accessing the vertical file, creating a horizontal file with the time series data ordered by terminal where data for each terminal has an address, creating a display for each terminal from the horizontal file, displaying each display in a corresponding one of the windows and producing a cross reference table with entries corresponding to the windows where each entry includes the address of the terminal data of the corresponding window; and format means for creating a new horizontal file and a new cross reference table with the terminal data of the new horizontal file and addresses thereof in the new cross reference table ordered corresponding to a display format desired by the user.

The method is a method of data collection and storage, comprising the steps of: (a) collecting time series data from remote locations; (b) storing the time series data in a vertical file ordered by time; (c) sorting the time series data by remote location into remote location data ordered by remote location; (d) storing the remote location data in a horizontal file in successive physical memory locations; (e) displaying the remote location data on a display having display locations and creating a display cross reference table having entries corresponding to the display locations, where the remote location data is displayed on the display with each entry including an address of the physical memory location in the horizontal file of the remote location data for the corresponding display location; and (f) creating a new horizontal file and a new display cross reference table when a user requests a display format change, wherein step (f) comprises: 1) obtaining the display format change; 2) retrieving an address of remote location data to be moved on the display from the cross reference table; 3) storing the retrieved remote location data in a physical location in the new horizontal file corresponding to the display location to which the remote location data is to be moved; and 4) storing the physical location in the new display cross reference table in an entry corresponding to the display location.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 3a–3c illustrates a reordering of data as stored and displayed and location table contents in accordance with the present invention;

FIG. 5 illustrates the overall operation flow when a user creates a horizontal file for display, displays that file, alters the contents of the file and alters the output format;

FIG. 6 is a flowchart of the process of the present invention when the user requests creation of a horizontal file;

BEST MODE OF CARRYING OUT THE INVENTION

Figure 1:
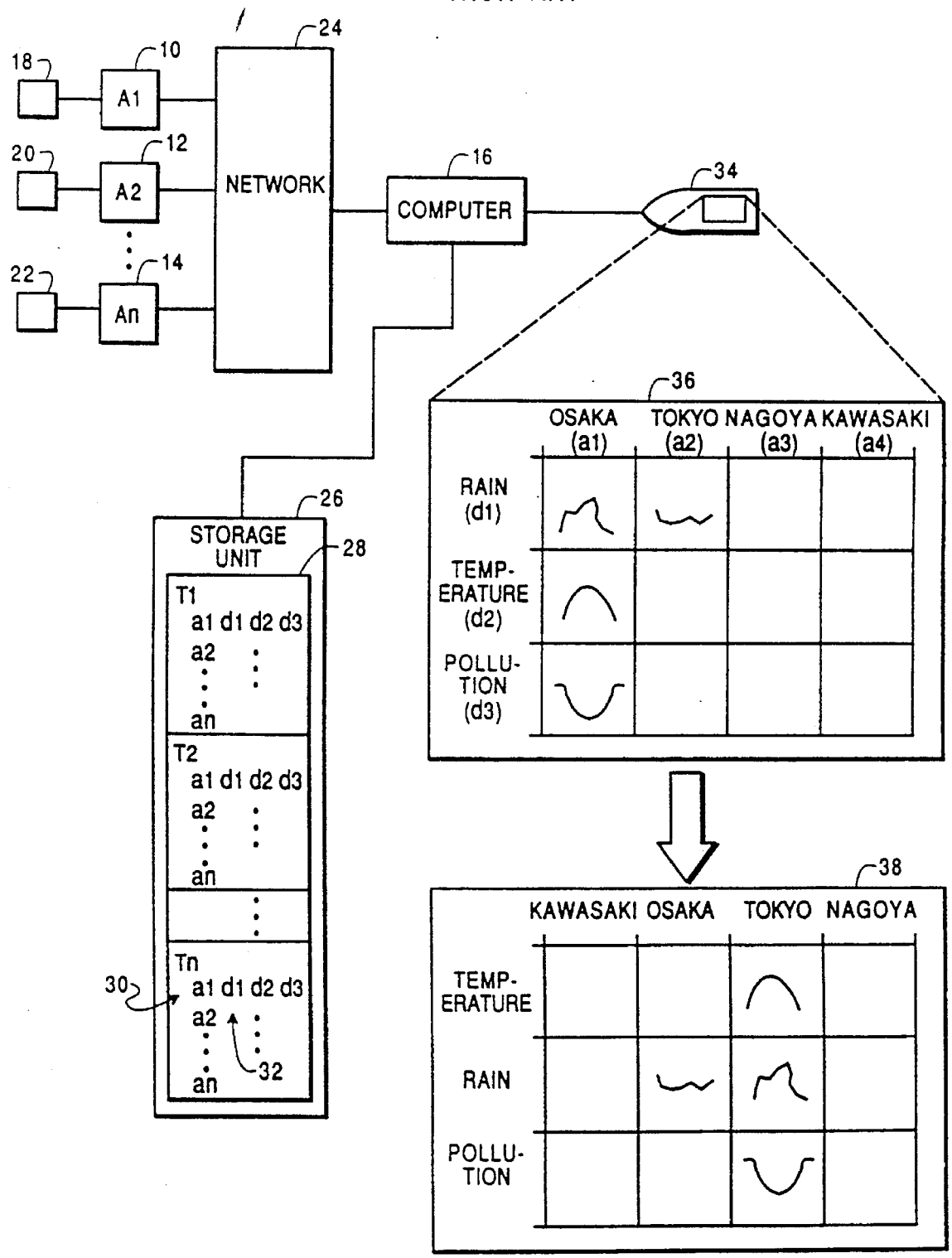
FIG. 1 illustrates a conventional system and the operations thereof, and is used to explain the problems therewith.
Figure 2:
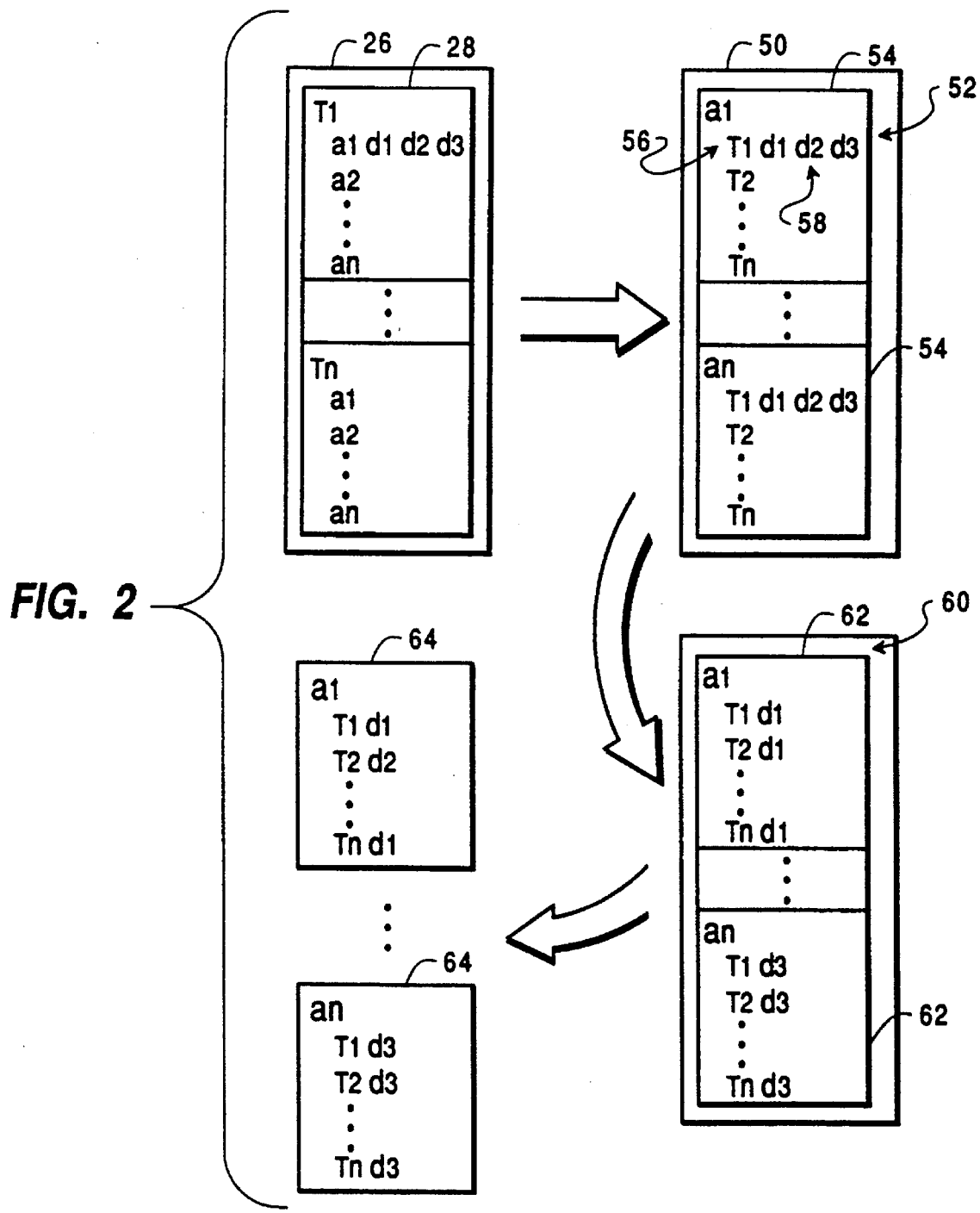
FIG. 2 depicts the transformation of a vertical file into a horizontal file in accordance with the present invention.

The present invention, as illustrated in FIG. 2, uses the vertical or time series file 28, created by the data sampling system software executing in the computer 16, to produce a horizontal location ordered file 52 in which the data is sorted by terminal or location and a record 54 for each location is created. Each record 54 includes an entry 56 for each time sample in the original vertical file 28 and the appropriate data collected from the corresponding terminal in the corresponding time slot in fields 58 of the entry 56. The system is also capable of converting the horizontal file 52 into a further segmented horizontal file 60 in which the data of each type collected from each terminal is included in a separate record 62. For example, the rain data for Osaka would be included in a record separate from the record for the temperature data for Osaka. This horizontal ordering and segmentation of the data facilitates the preparation of the location and data type graphs illustrated in FIG. 1 and also facilitates the reordering of the data necessary to create the reordered display 38, also illustrated in FIG. 1. The system is further capable of dividing the horizontal segmented records of file 60 into individual files 64 which can facilitate the creation of the graphs of FIG. 1, since the conventional graph creation software need only receive the file name of the data to create an appropriate graph. It is possible for the system to discard the vertical file once a complete horizontal file is created, however, it is preferred that the vertical file be retained, thereby creating a multidimensional database of the time series data. The storage of the data in both horizontal and vertical files also increases data security by automatically having a backup or duplexed data source.

The present invention, as illustrated in FIGS. 3a–3c, reorganizes the storage order of the records 62 or files 64 in accordance with the rearrangement of the display requested by the user. In the example of FIG. 3, which illustrates the principles of operation of the data reorganization embodiment of the present invention, the segments of the display 72 have been arranged in a completely different order than the original display 70. For example, the original display 70 includes the data d1 from terminal a1 located in the upper left hand display segment or window P-A while in the rearranged display 72 this same data is located in the segment or window corresponding to the second row and the third column. The original order of the records or files corresponding to the display 70 is shown on the left hand side of FIG. 3b with the horizontal file 74 having the records or files sorted by row and then by column. The present invention using a cross reference table 76 accesses and reorders the records or files in the file 74 into the order shown in file 78 of FIG. 3c which corresponds to the row and column order of the rearranged display 72. In this situation it is preferred that the records or files be physically sequential on the storage media. The cross reference table 76 has its entry and field locations, which contain the physical media address of the data corresponding to the segment or window of the display of data, rearranged, as illustrated by table 80 in FIG. 3c, to reflect the new locations for the data in the file 78. That is, the originally created table 76 is updated to reflect the new locations of the data as rearranged in the display 72. The details of the operation of the present invention with respect to FIGS. 2 and 3 will be discussed with respect to flowchart FIGS. 4–8. It is preferred that a high speed computer such as a mainframe or minicomputer be used to implement the present invention because of the need for a high processing speed, that software written in the C++ computer language be used and that an operating system such as UNIX be used.

Figure 4:
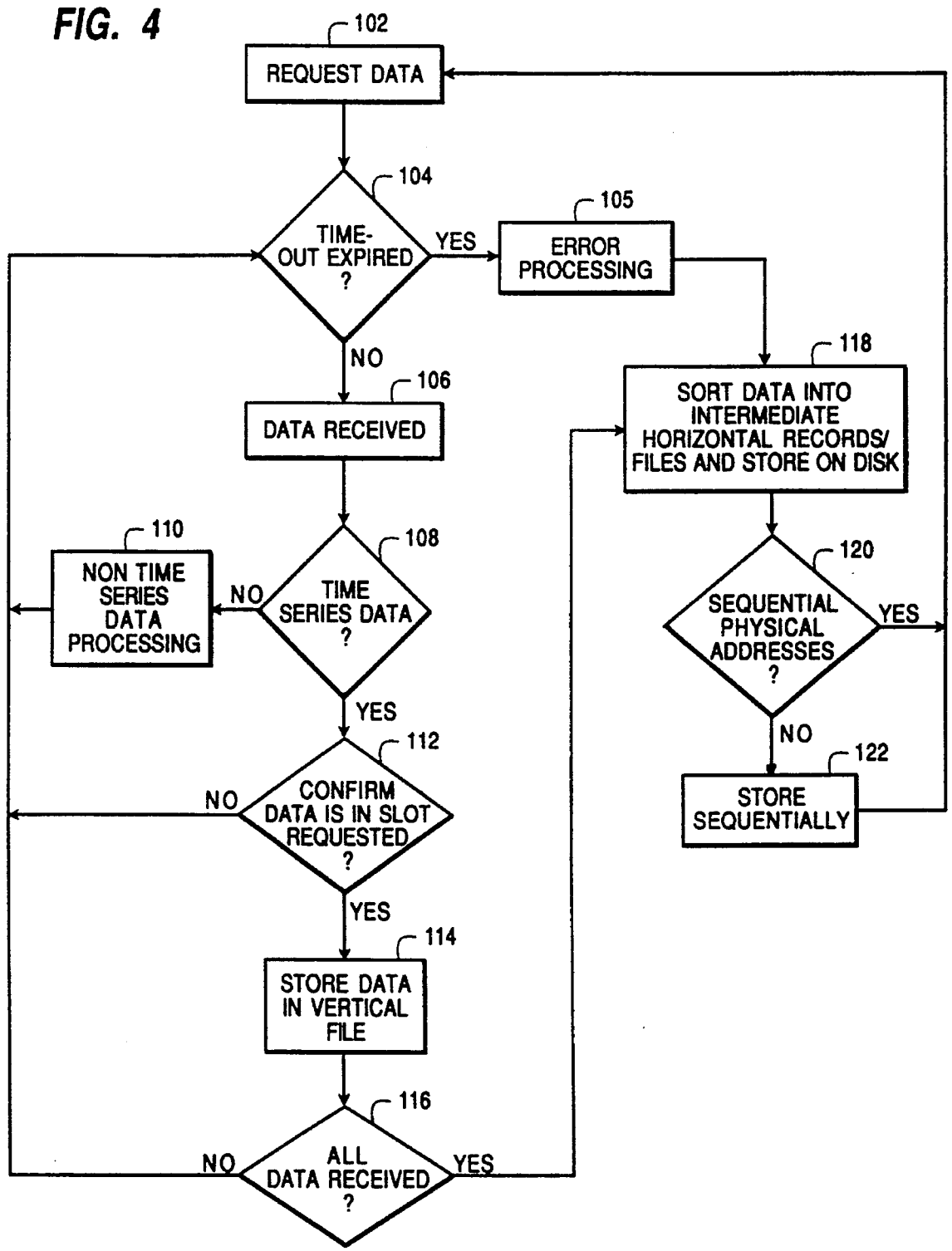
FIG. 4 is a flowchart of the data capture and storage process of the present invention.

As illustrated in FIG. 4 the data sampling and storage process of the present invention starts 102 with a request by the computer 16 to the terminals 10–14 for data collected during a particular time slot or time interval. This request is output over the network 24 to the terminals 10–14. The computer 16 also starts a timeout timer which is checked 104 to determine whether the time for all of the terminals to respond has expired. If not, when data is received 106, as denoted by a non-empty input buffer, the computer checks 108 to determine or discriminate whether the data received is time series data. This check is performed because the data received could be other than time series data. If the data received is non-time series data, non-time series data processing is performed on the data in the buffer. If the data is time series data, the system 16 confirms 112 whether the data is in the time slot requested. That is, the data request 102 transmitted previously is a request for data taken during a predetermined time slot and if time series data for a time slot other than the slot requested is received it is not processed. If the data is in the proper time slot, the data is stored 114 in the vertical file 28 in the order of the time slots in which the data was sampled. The system then checks 116 to determine whether all the terminal data has been received, that is, whether the data for a particular time window has been received. If not, the system returns to wait for new data. If all the data has been received the system, using conventional sorting techniques, can sort the data into the horizontal records 54 or 62 and/or the horizontal files 64. These records or files are then stored in a storage media, such as a hard magnetic disk. This embodiment creates a complete horizontal file which matches or duplicates the contents of the vertical file. The system then determines 120 whether the records or files as stored are located in sequential physical addresses on the disk. If not the system calls 122 a conventional operating system utility which will insure that the data is stored in sequential locations on the disk. The sequential storage of the data is important to reducing search time.

Once the system has created the vertical file 28, it is possible for the user to use the data to create a multi-window display, alter the data used in the display and change the format of the display. A typical such sequence is illustrated in FIG. 5. First, the user requests that a particular display of, for example, rain data for only a few of the terminals 10–14 be created. The system then accesses the vertical file 28 and creates 124 the display as requested by the user. The system then stores 126 the data obtained for the display in an appropriate horizontal file. The operations of steps 124 and 126 will be discussed in more detail with respect to FIG. 6. Once the display is created, the user could request that the file be altered by, for example, including in the file the latest time sample data. The file contents are altered 128 as requested after which the altered file is again stored 130 in the horizontal file. As another example of data alteration, the user could request that the data be compressed from, for example, data points taken every minute to an average for each hour. The steps 128 and 130 will be discussed in more detail with respect to FIG. 7. Once the user has created the display showing the data that is desired, the user may want to alter the display format. The display is altered 132 as requested after which, to enhance the speed of future searches, the order of the data or records in the horizontal file is changed 134. Steps 132 and 134 will be discussed in more detail with respect to FIG. 8.

Once the vertical file 28 has been created, if a user does not want to create a complete duplicate of the contents of the vertical file in a horizontal file, as was discussed with respect to FIG. 4, the user can request that only desired data be used to create the horizontal file. Such an embodiment improves data storage efficiency as well as search speed. A user will also want to create the displays 36 or 38. When this request 140 occurs, as illustrated in FIG. 6, the vertical file 28 is accessed 142 and sorted as requested. This access and sorting is performed conventionally by for example the user specifying that he wishes to create displays for the rain from three terminals. In this situation the system would read the vertical file 28 searching for the terminals specified and obtain the contents of the field 32 requested by the user. This data when read would be stored in a file which would be conventionally sorted by terminal into a horizontal file. The system then transfers the horizontal file created to a conventional window controller program such as the X-window system of UNIX that accesses a conventional graphic display system creation program that creates 144 the appropriate graphical displays for each of the designated windows using the Graphical User Interface of UNIX. Once the display has been created for the user, the system prompts the user concerning whether this display should be stored as an intermediate horizontal file. If so, the system stores 150 the data in the intermediate horizontal file and then checks 152 to determine whether the data as stored has been stored physically sequentially and, if not, calls the appropriate operating system utility to ensure that the data is stored sequentially.

Figure 7:
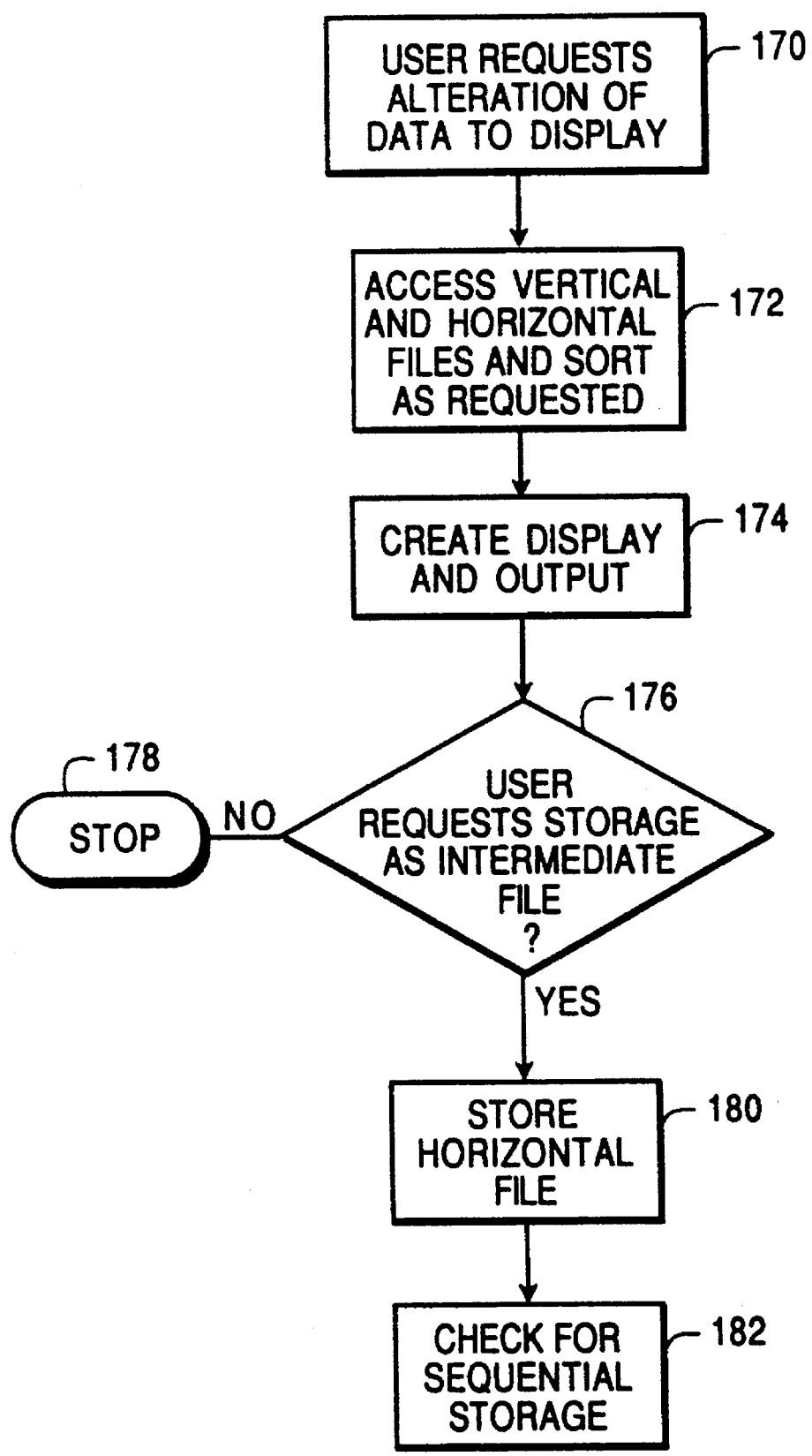
FIG. 7 illustrates the process when the user adds data to the horizontal file.

Once the horizontal file has been created, it is possible for the user to request that additional data be added to the horizontal file or for the file to be edited. For example, after additional rain data for an additional time period is collected, the user may desire to add this additional rain data to the horizontal file already created. In this situation, as illustrated in FIG. 7, when the user requests 170 the addition of such data, the system accesses both the vertical and horizontal files and in a conventional manner obtains the additional data from the vertical file, stores it in the horizontal file and sorts the data in the horizontal file according to the terminal and data type order requested. This situation not only includes the addition of new data to records already created, for example, the addition of additional rain data samples for a particular terminal, but also includes the possibility that the user will want to add different terminals or different types of data to the display such as to add pollution data. This step could include other editing operations such as averaging data taken every minute into averages for each hour, thereby compressing the data files. Once the system has sorted the data into the order requested or altered the data as requested, the display is created 174 and output to the display device 34. If the user is satisfied with this latest display, the user can request 176 that the data be stored as a horizontal file in which case the data is stored 180 in the already created horizontal file. Once this is accomplished the system again checks 182 to determine whether the records of the horizontal file have been stored in sequential memory addresses in the storage media, such as a magnetic disk.

In steps 144 of FIG. 6 and 174 of FIG. 7 it is preferred that the software which creates the window display create a cross reference table 76, as illustrated in FIG. 3B, where the address of the location of the record or file used to create the corresponding portion of the display can be found. It is also possible to use the file header as the entry in this table instead of the physical address on the storage media. The index into this table 76, as illustrated in FIG. 3B, is the row and column coordinates of the corresponding portion of the display. The creation of this table is conventional and within the skill of those of ordinary skill in the art and should be created as the display windows are filled by the window controller software.

Figure 8:
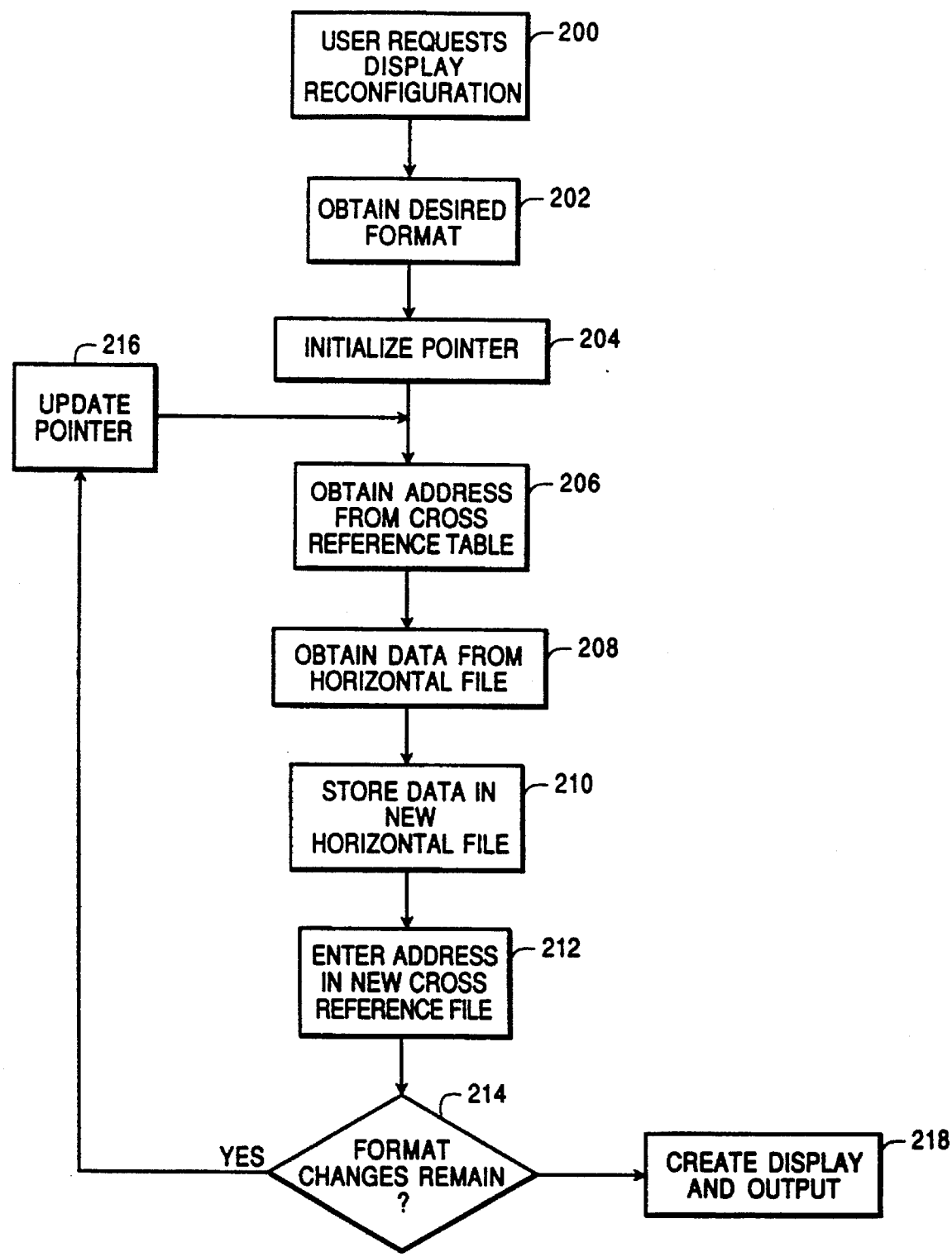
FIG. 8 illustrates the operation of the present invention when a output format change is requested.

When the user, as illustrated in FIG. 8, requests 200 the reconfiguration of the display, the user preferably creates a desired display configuration table, as illustrated in the right side of FIG. 3A, which either uses the terminal and data type to identify what data should be used in that portion of the display or, if the system provides the file names for each of the files 64, the user could substitute file names for the terminal and data type indicators. Of course, other methods of specifying the desired display format could be used such as allowing the user to point and click using a mouse to specify a move command and then specify the source and destination for the move and thereby creating a list of move commands. Once the user has requested the display reconfiguration, the system obtains the desired format (the desired display configuration table) in a form such as the table corresponding to the right side of FIG. 3A mentioned above. Once the format is obtained, the system initializes 204 a pointer to the list or table specifying the desired format. From the index coordinates of the table 72, the entry in (address of the record or file) in the cross reference table 76 corresponding thereto is obtained 206. For example, if the user were to supply the desired format in the form illustrated in the right side of FIG. 3A, the system first obtains the coordinates for the upper left hand portion of the display where the coordinates Q-D are obtained. The system then accesses the table 76 in the Q-D entry and obtains the address, for example 4CCC, which is the address where the corresponding data can be obtained in the file 74 on the media. The system then stores 210 this data in a new horizontal file 78 and enters 212 the new address, for example 5AAA, in the corresponding location of a new table 80 illustrated on the right in FIG. 3C. The system then examines the pointer to the table 72, shown in the right side of FIG. 3A, to determine 214 whether any additional format changes remain to be processed. If so, the pointer is updated 216 and the system moves the designated data from file 74 to file 78 and updates the table 80. This process continues until all of the entries of the desired format table 72 have been processed, at which point the system creates 218 a corresponding display and outputs that to the user for review. If the user is satisfied with this display, the system ensures that the data in the new file 78 is sequentially stored as previously discussed. The original horizontal file and table and the new horizontal file and table can both be stored, thereby creating another dimension in the entire database. However, as such files accumulate the least recently used file should be discarded as the storage space gets full. If the user requests a further reconfiguration of the display, the process of FIG. 8 is again executed. This further embodiment creates a free format data editing system allowing the user to freely alter the display format without creating files which are inefficient to search.

Because the system updates the cross reference table to include the latest addresses of where the data is stored, the system need not perform a low efficiency/sequential search for each record as required in the prior art. The cross reference table allows the files or records being used for a display to be accessed randomly very efficiently. The use of the cross reference table also solves a problem created by a horizontal file that is searched sequentially. For example, if the user decided that the record or file P-B (See FIG. 3B) should appear after the record P-D, a sequential search system, after finding the record P-D, would search all the way through to the end of file 74 and then start searching the file 74 from the beginning. A very inefficient operation. The cross reference table for the file allows the system to go straight to the address of P-B after the P-D processing is completed. A significant improvement in the searching efficiency.

INDUSTRIAL APPLICABILITY

The system of the present invention is designed to process and display time series data such as rain or earthquake data collected from remote locations and allow the user to easily rearrange the data for display or printout in desired formats for different uses.

The many features and advantages of the invention are apparent from the detailed description and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, the description discusses the invention with respect to multiple data values being used to create graphs of data displayed in display windows, however, each window could include a single data value. Of course other types of displays than graphical displays could be created, such as spread sheets. The invention also discusses producing the windows on a single display and it is of course possible for each window to occupy a complete CRT display in an emergency response center or for the system to create a display of only the data from a single terminal which then occupies an entire display. Further, FIG. 8 shows the display being produced after the data file is rearranged and the table is updated. It is of course possible to output the data to the display for each window as it is stored in step 210.

What is claimed is:

1. A data collection and storage system, comprising:

data collection terminals for producing time series data at remote locations;

a communication network connected to said data collection terminals and communicating the time series data;

data storage means for storing data; and sample collection means, connected to said communication network, for collecting time series data from the remote locations over said communication network and storing the time series data in said data storage means, said sample collection means comprising:

first means for storing the time series data in said storage means ordered by time and by remote location within each time;

second means for creating a data file of the time series data ordered by remote location and by time within each remote location; and display means for displaying the time series data for each remote location in a different area of a same display;

wherein said data storage means includes physical memory locations and said second means stores the time series data ordered by remote location in successive physical memory locations of said data storage means;

wherein said second means creates the data file when the time series data is displayed;

wherein said second means creates a display cross reference table having entries corresponding to the different areas on the display where each of the entries includes a physical address, in the data file, of the time series data displayed in the corresponding display area and used for creating the display; and further comprising format change means for creating another data file and another display cross reference table when a display format change occurs, said another data file having the time series data stored in different physical addresses in said data storage means corresponding to display location and said another display cross reference table having the entries corresponding to the different physical addresses.

2. A method of data collection and storage, comprising the steps of:

collecting time series data from remote locations over a communication network from data collection terminals;

storing the time series data in a first file ordered by time;

sorting the time series data by remote location into remote location data ordered by remote location and by time within each remote location;

storing the remote location data in a second file in successive physical memory locations;

displaying the remote location data for different remote locations in different areas of a same display;

displaying the remote location data on the display having display locations and creating a display cross reference table having entries corresponding to the display areas, where the remote location data is displayed on the display with each entry including an address of the physical memory location in the second file of the remote location data for the corresponding display location and said cross reference table being used to change the display; and creating another second file and another cross reference table when a display format occurs, comprising:
1) obtaining the display format change;
2) retrieving an address of remote location data to be moved on the display from the cross reference table;
3) storing the retrieved remote location data in a physical location in the another second file corresponding to the display location to which the remote location data is to be moved; and
4) storing the physical location in the another display cross reference table in an entry corresponding to the display location.

3. A data collection and storage system, comprising:

data collection terminals for producing time series data at remote locations;

a communication network connected to said data collection terminals and communicating the time series data;

data storage means for storing data; and sample collection means, connected to said communication network, for collecting time series data from the remote locations over said communication network and storing the time series data in said data storage means, said sample collection means comprising:
first means for storing the time series data in said storage means ordered by time and by remote location within each time;
second means for creating a data file of the time series data ordered by remote location and by time within each remote location; and display means for displaying the time series data for each remote location in a different area of a same display; and wherein said second means divides the data file into location files associated with each remote location and provides a location name for each location file and divides the location files into data type files each data type file storing different type data for a location and ordered by time for the data type.

4. A method of data collection and storage, comprising the steps of:

collecting time series data from remote locations over a communication network from data collection terminals;

storing the time series data in a first file ordered by time;

sorting the time series data by remote location into remote location data ordered by remote location and by time within each remote location;

storing the remote location data in a second file in successive physical memory locations;

displaying the remote location data for different remote locations in different areas of a same display;

creating location files with corresponding location names using the remote location data in the second file; and creating type files from the remote location files with corresponding location-type names using type data in the location files.

* * * * *

UNITED STATES PATENT AND TRADEMARK OFFICE
CERTIFICATE OF CORRECTION

PATENT NO. : 5,519,861
DATED : May 21, 1996
INVENTOR(S) : Ryu et al.

It is certified that error appears in the above-indentified patent and that said Letters Patent is hereby corrected as shown below:

```
Column 1, line 39, ""T"" should be --"T,".
Column 3, line 52, "illustrates" should be
     --illustrate--.
```

Signed and Sealed this

Thirteenth Day of August, 1996

Attest:

BRUCE LEHMAN

*Attesting Officer*     *Commissioner of Patents and Trademarks*